Feb. 26, 1946.   J. T. HAYWARD   2,395,407
MECHANISM FOR MEASURING THE MOVEMENTS OF DRILLING TOOLS AND PIPE
Filed Jan. 10, 1942   3 Sheets-Sheet 1

JOHN T. HAYWARD INVENTOR
BY *R. Werlin*
ATTORNEYS.

JOHN T. HAYWARD INVENTOR

BY
ATTORNEYS.

Feb. 26, 1946. J. T. HAYWARD 2,395,407
MECHANISM FOR MEASURING THE MOVEMENTS OF DRILLING TOOLS AND PIPE
Filed Jan. 10, 1942 3 Sheets-Sheet 3

JOHN T. HAYWARD INVENTOR.

BY

ATTORNEYS.

Patented Feb. 26, 1946

2,395,407

UNITED STATES PATENT OFFICE 2,395,407

MECHANISM FOR MEASURING THE MOVEMENTS OF DRILLING TOOLS AND PIPE

John T. Hayward, Tulsa, Okla.

Application January 10, 1942, Serial No. 426,270

2 Claims. (Cl. 33—127)

This invention relates to measuring mechanism and particularly to mechanism for measuring the movements of drilling tools and pipe in the rotary drilling of oil and gas wells and the like.

In the measurement of the depths of wells during rotary drilling and of the length of the drilling strings employed in drilling, a method found most accurate for this purpose consists in attaching a measuring line to the traveling block of the rig, guiding the line over a measuring pulley suitably mounted on the derrick and counting or measuring the rotations of the measuring pulley as it is driven by the measuring line in response to the vertical movement of the traveling block. Such a method and apparatus are shown and described in the U. S. patent of John T. Hayward, No. 2,166,212, dated July 18, 1939.

In one embodiment of the measuring apparatus described in the aforesaid Hayward patent, the measuring pulley is mounted on the shaft of a Selsyn motor, which is electrically connected to a matching Selsyn motor which drives a register. As the measuring line runs over the measuring pulley, the armature of the Selsyn motor attached thereto is rotated, causing synchronous rotation of the Selsyn motor attached to the register which then registers the number of rotations of the measuring pulley or the lineal equivalent of these rotations.

The present invention has for its principal object the provision of an improved form of reel for feeding the measuring line over a measuring pulley in accordance with the movements of the traveling block or other moving member to provide a suitable index of the depth of the well or of the length of the string of tools moving therein.

The reeling device in accordance with this invention comprises a reversibly rotatable reel to which one end of the measuring line is attached, and to and from which the line is fed. The reel is spring controlled and is provided with a friction clutch and an air friction control brake, all of which have novel and important functions in a device of this character as will be more fully described hereinafter.

Other and more specific objects and advantages of this invention will become apparent from the following detailed description when read in conjunction with the accompanying drawings which illustrate useful embodiments in accordance with this invention.

Figure 1:
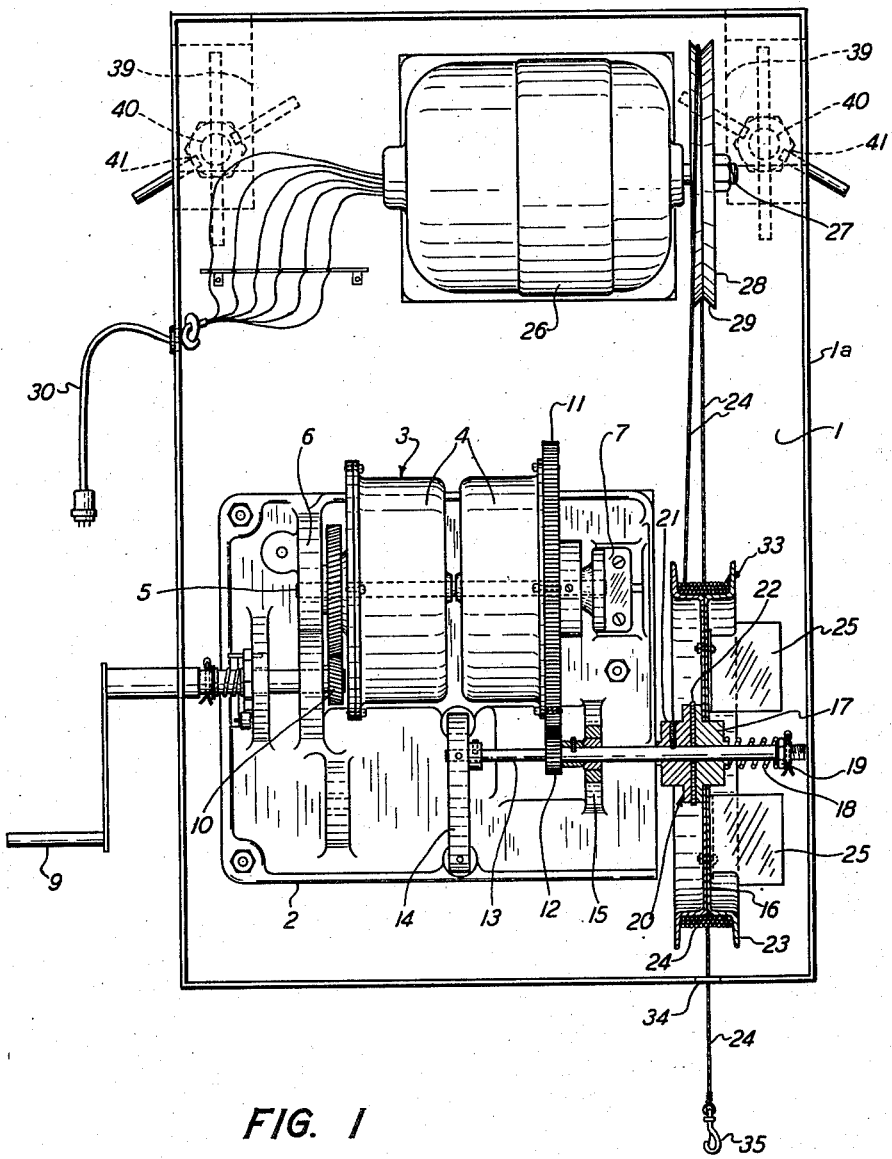
Fig. 1 is a front elevational view of an assembly of a reeling device in accordance with this invention, having the reel proper shown in section.
Figure 2:
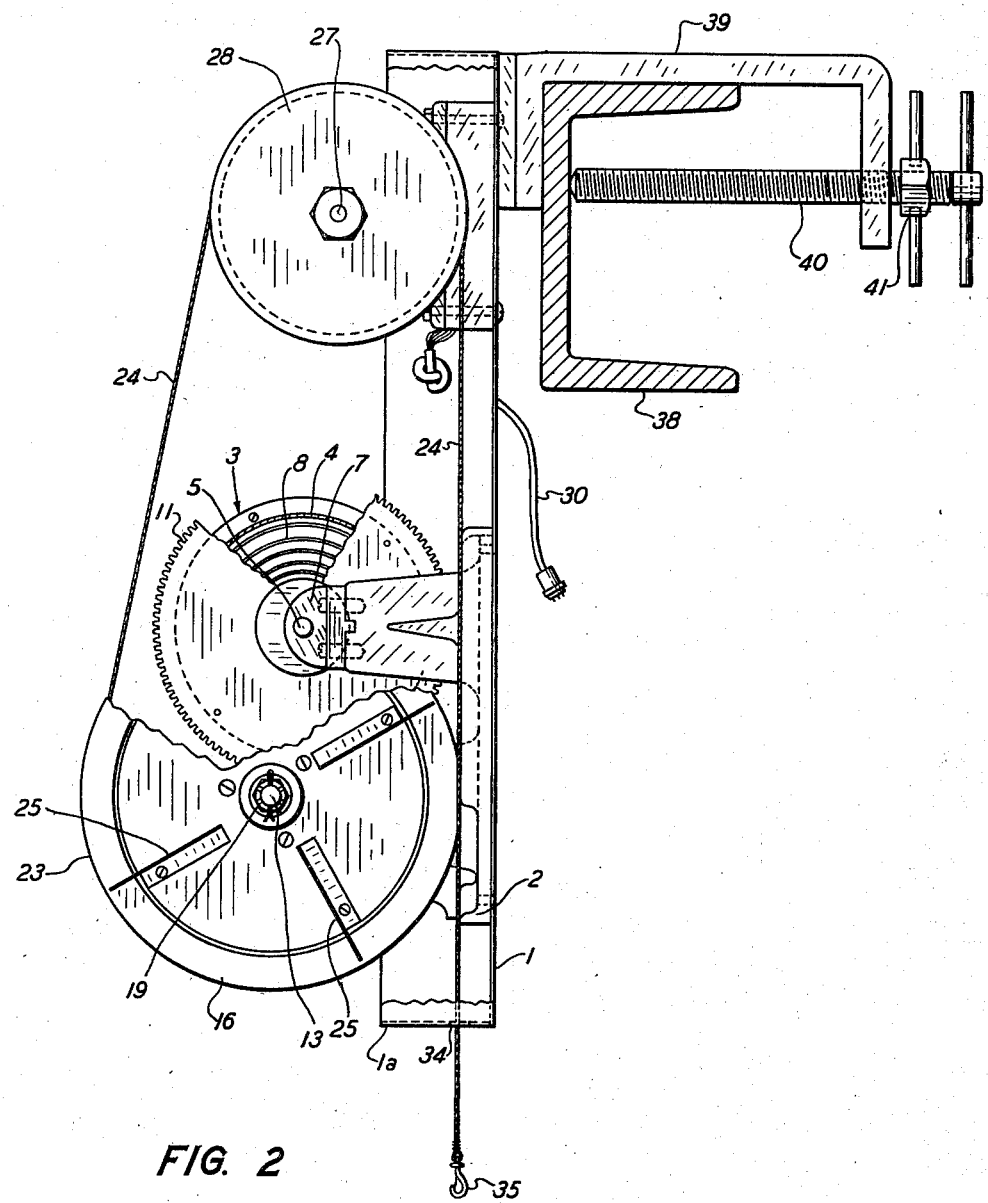
Fig. 2 is a side elevation of the device partially broken away to better illustrate details thereof.

Referring to the drawings, the device of this invention is shown mounted on a rectangular panel 1, enclosed within an upstanding rim 1a. A base plate 2 is bolted to panel 1 adjacent one end thereof. Mounted on base plate 2 is a tensioning device in the form of a spring motor, designated generally by the numeral 3. Spring motor 3 is of a more or less conventional form and construction, such, for example, as a conventional phonograph motor. Such a motor conventionally consists of a two-part housing 4 mounted on a shaft 5 which is journalled in bearings 6 and 7 mounted on base plate 2. Each of the parts of housing 4 contains a strong coil spring 8 (Fig. 2) which are adapted to be wound, in the usual way, by rotation of the housing in one direction, and unwound by rotation of the housing in the opposite direction. For winding motor springs 8, housing 4 is rotated in one direction by means of a handle 9 operating through a gear train 10 connected to one end of housing 4. The opposite end of housing 4 has a ring gear 11 mounted thereon in mesh with a pinion 12 which is mounted on a reel shaft 13 journalled in bearings 14 and 15 mounted on base plate 2. With the described arrangement and connection of the spring motor 3 to shaft 13, the power of the motor is delivered to the shaft to produce rotation thereof in one direction or to increase the power when the shaft is rotated in that direction by an extraneously applied force. At the same time the motor springs resist rotation of the shaft in the opposite direction with increasing power until a maximum resistance is attained, namely, when the motor is fully wound.

A reel 16, having a central hub 17 is mounted to float on the outboard end of shaft 13, the shaft extending through the hub to the outside of the reel. A coil spring 18 is mounted on the extended end of shaft 13 and is held in compression against the outer face of hub 17 by means of an adjustable follower nut 19 which is screwed on the outer end of shaft 13 which is threaded for reception of the nut. The inner face of hub 17 is smoothly machined to form one of the plates of a friction clutch, designated generally by the numeral 20. A disk plate 21 rigidly mounted on shaft 13 opposing the inner face of hub 17 forms the other member of the clutch, and a composition disk 22, mounted to float on shaft 13, is interposed between the adjacent faces of hub 17 and plate 21 to provide for the development of the friction necessary to cause engagement of the clutch when the plates are pressed together by coil spring 18. The compression of coil spring 18 against hub 17 serves to yieldably hold the latter in frictional engagement with plate 21 through the medium of disk 22, and is of sufficient strength to normally transmit, through clutch 20 to reel shaft 13, torque sufficient to wind motor springs 8 through engagement of pinion 12 and ring gear 11 and to maintain the clutch in engagement when the reel is being turned by the unwinding of line 24 from the reel. However, when motor springs 8 have become fully wound, the described construction of clutch 20, providing a yielding connection between the spring and the reel, will permit slipping of the clutch when reel 16 is turned in a direction which would otherwise tend to overwind the motor springs and break them. That is, when housing 4 has reached the limit of its rotation in the direction resulting in the full winding-up of spring 8, reel 16 will continue to turn on shaft 13 without producing corresponding rotation of the shaft.

The periphery of reel 16 is provided with a flanged rim 23 which is channel-shaped in cross section, the channel opening outwardly from the reel periphery to provide a magazine for the reception of a measuring line 24, which is fed to and from the reel as will be later described. Means for braking the movement of the reel at a predetermined speed comprising, a plurality of flat rectangular vanes 25, constructed of light metal or other rigid material, are mounted on the outer face of reel 16, extending at right angles thereto and radially arranged relative to the hub of the reel. This arrangement of vanes 25 on the reel provides an air friction brake for the reel, to control its speed in the event breaking of measuring line 24 should release the reel while the motor springs are strongly wound.

Mounted on panel 1 rearwardly of base plate 2 is a measurement receiving device in the form of a Selsyn motor 26 disposed so that its armature shaft 27 is parallel to reel shaft 13. A measuring pulley 28, having a peripheral groove 29 for reception of measuring line 24, is fixedly mounted on armature shaft 27 so that its grooved edge is longitudinally aligned with the channel rim 23 of reel 16. Selsyn motor 26 is provided with a conductor cable 30 adapted for electrically connecting Selsyn motor 26 to a matching Selsyn motor 31 which drives a measurement register 32 (see Fig. 3).

One end of measuring line 24 is fastened to rim 23 of the reel at 33 and the other end is threaded in groove 29 over measuring pulley 28 and thence passes below reel 16 through an opening 34 in rim 1a to the exterior of panel 1. The free end of measuring line 24 is provided with a spring hook 35 for attachment to an object whose movements are to be measured. Measuring line 24 is constructed of single or multi-stranded wire or fibre, which is preferably resistant to stretch under load.

Figure 3:
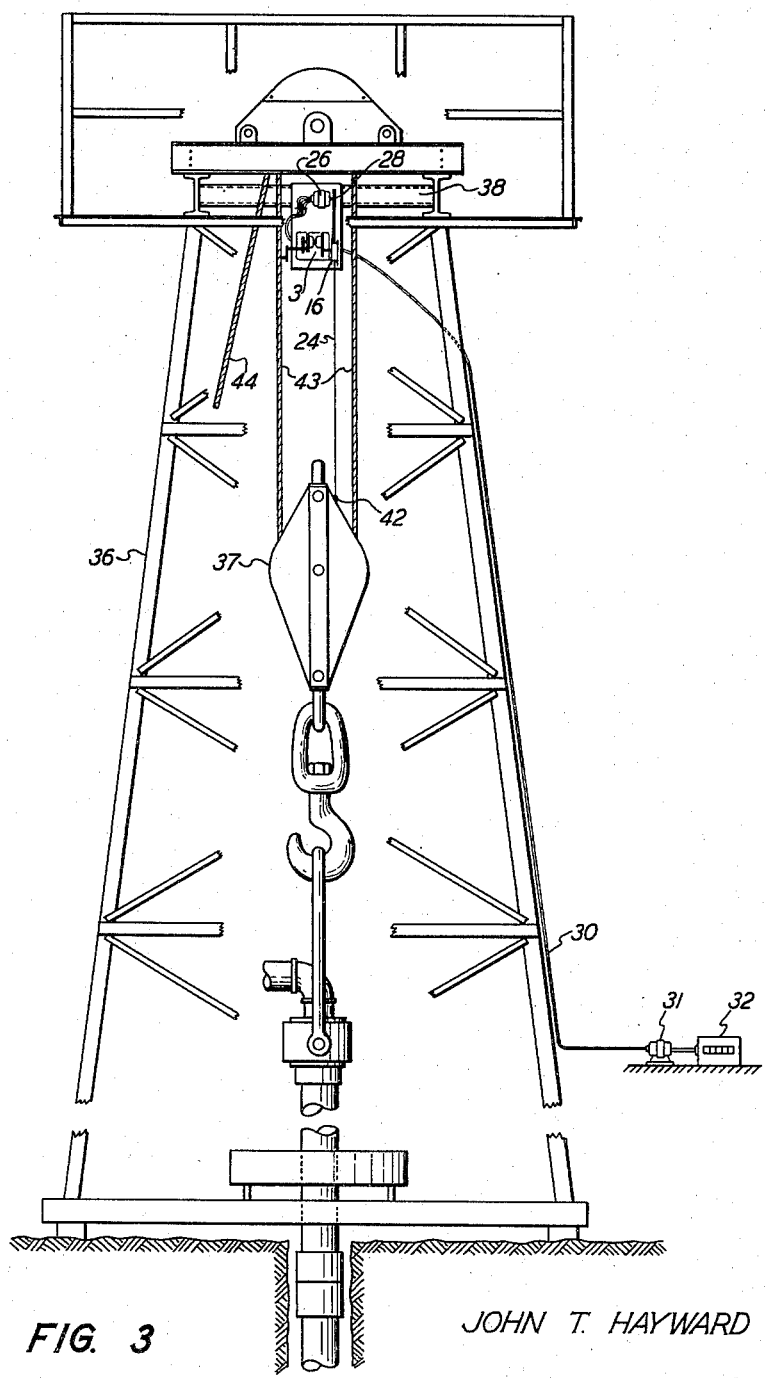
Fig. 3 is a view of the device mounted on a drilling derrick.

Fig. 3 illustrates the manner in which the reeling device of this invention may be conveniently mounted on a drilling derrick 36, when employed for measuring the vertical movements of a traveling block 37. For this purpose, panel 1 is preferably hung in vertical position from one of the channel girts 38 of the derrick crown. A pair of spaced C-clamps 39 are attached to the back of panel 1 and extend rearwardly therefrom for suspending the panel from girt 38 (see Fig. 2). Each of the C-clamps 39 is provided with a set-screw 40 and a lock-nut 41 for firmly attaching panel 1 to the girt 38 as shown. With the panel 1 thus suspended from girt 38, the free end of measuring line 24 is attached by means of spring hook 35 to a suitable loop 42 mounted on traveling block 37. Traveling block 37 is suspended from the crown block of the derrick in the usual way by means of a cable 43 reeved over the crown block sheaves (not shown) and the sheaves of the traveling block. The traveling block is raised and lowered in the derrick in the usual way by pulling and relaxing the free end 44 of cable 43.

When suspended in the derrick as shown in Fig. 3, the reeling device operates in the following manner: When traveling block 37 moves downwardly, the resulting downward pull on the free end of measuring line 24 draws the measuring line off of reel 16 over measuring pulley 28. This causes reel 16 to drive shaft 13 through clutch 20 in a direction opposed to the force of motor springs 8. This action causes the motor springs to become more tightly wound thereby maintaining strong tension on the measuring line. The movement of the measuring line over measuring pulley 28 produces corresponding rotation of the armature of Selsyn motor 26 which synchronously transmits these rotations to Selsyn motor 11 and thence to register 32 which registers the number of rotations of pulley 28 or their lineal equivalent as determined by the diameter of pulley 28.

When the downward pull on line 24 is relaxed, as when the traveling block is drawn upwardly, the torque opposing the force of motor springs 8 is released and the springs 8 tend to unwind thereby rotating reel 16 in the opposite direction and causing measuring line 24 to be wound thereon under the tension of the motor springs. Measuring pulley 28 is, of course, driven in the opposite direction and these rotations are also transmitted through the matching Selsyn to the register if desired.

When used on conventional rotary drilling derricks, as much as 120 feet or more of measuring line may be required to measure the full extent of the travel of traveling block 37. To maintain firm tension on the measuring line throughout the full length of its travel in both directions, it is desirable that maximum strength of motor springs 8 be continually exerted, that is, all the winding and un-winding of the motor springs should take place in the torque range of the motor springs approaching their fully-wound condition. For this reason, it is generally desirable to begin operations with the springs in the fully wound position, however, with the springs in this condition, when it is attempted to draw the measuring line downwardly to fasten it to the traveling block, whether the block be close to the derrick floor or adjacent the top of the derrick, the corresponding rotation of reel 16 would tend to overwind springs 8 and would normally cause them to break. However, due to the slip characteristics of clutch 20, reel 16 can be turned in this direction on shaft 13 without exerting increased torque on the motor springs. At the same time, whatever length of measuring line must be fed from reel 16 to make connections with the traveling block will still produce corresponding rotations of measuring pulley 28 and the measurement of this length of line will be recorded, if desired. Maintenance of strong tension at all times on the measuring line, and a continuous record of all of its movements are very important considerations when measuring well depths and the lengths of well strings.

In view of the fact that it is necessary to feed as much as 120 feet or more of line to and from reel 16 and to maintain strong tension thereon at all times, it is obvious that motor springs 8 must be quite long and powerful, in order that the reeling operations may be conducted in the upper torque range of the motor springs. Under these conditions, if measuring line 24 should break, reel 16, freed of all restraint, would be revolved at such terrific speeds by the motor springs as to destroy the entire reeling apparatus. To counter-act this possibility, vanes 25 are provided. When a break occurs and the reel begins to revolve at high speeds, vanes 25 act against the resistance of the air to quickly check the speed of revolution of the reel and limit it to a speed which is well within safe limits. The degree of breaking force of vanes 25 will, of course, depend upon their total area, as determined by the number of vanes and their dimensions. The number and size of the vanes may be varied as desired to suit the particular conditions encountered.

It will be understood that the slipping of clutch 20 will also prevent the safe load on line 24 from being exceeded and thereby prevent breaking of the line. Thus clutch 20 is designed to slip when the tension on line 24 exceeds a pre-determined value, which may be either the breaking strength of the springs 8 or other parts of the motor 3, or the breaking strength of line 24.

It will be understood that various alterations and modifications may be made in the details of this invention within the scope of the appended claims without departing from the spirit of this invention.

What I claim and desire to secure by Letters Patent is:

1. The combination with a well-drilling derrick and traveling block suspended therein, of a reel supported on said derrick, a measuring pulley, a measuring line secured at one end to said reel, said line passing around said measuring pulley and attached at its other end to said block, a single unitary device for taking up slack and maintaining tension on said line under all conditions, said device comprising a spring motor, a friction clutch interposed between said spring motor and reel and serving to permit slippage under excess strain, and means independent of said reel for winding said spring motor, and means for transmitting the movements of said measuring pulley to an indicating device.

2. In a rotary well drilling installation including a derrick and a traveling block suspended therein, the combination with a reel and a measuring pulley mounted on said derrick, of means whereby all movements of said block accurately produce corresponding movements of said measuring pulley under all conditions, said means comprising a measuring line secured at one end to said reel, said line passing around said measuring pulley and thence directly to said block, to which its other end is attached, a single unitary device for taking up slack and maintaining tension on said line at all times, said device comprising a spring motor mounted adjacent said reel and having an operating connection with said reel, said connection including a friction clutch, and means for transmitting the movements of said measuring pulley to an indicating device.

JOHN T. HAYWARD.